United States Patent [19]

Kiefer

[11] 4,280,925
[45] Jul. 28, 1981

[54] FILTER FOR SORPTION OF HEAVY METALS
[75] Inventor: John E. Kiefer, Kingsport, Tenn.
[73] Assignee: Eastman Kodak Company, Rochester, N.Y.
[21] Appl. No.: 164,473
[22] Filed: Jun. 30, 1980
[51] Int. Cl.³ .............................................. C02F 1/42
[52] U.S. Cl. .................................... 252/428; 210/679; 210/688
[58] Field of Search ................ 252/428; 210/688, 679; 106/194

[56] References Cited

U.S. PATENT DOCUMENTS

| | | | |
|---|---|---|---|
| 3,317,312 | 5/1967 | Kraus et al. | 210/688 X |
| 3,408,291 | 10/1968 | Thomas et al. | 210/665 |
| 4,026,796 | 5/1977 | Wegmuller et al. | 210/679 |

Primary Examiner—Patrick Garvin
Attorney, Agent, or Firm—Malcolm G. Dunn; Daniel B. Reece, III

[57] ABSTRACT

A hydrophilic, cellulose ester material that may be used as a filter or ion exchanger to sorb heavy metal ions, such as silver, mercury, lead, copper and cadmium, from aqueous solutions, the material having incorporated therein a high surface area zinc sulfide of at least 15 square meters per gram, and preferably at least 24 square meters per gram; and method for incorporating high surface area zinc oxide into a cellulose ester material by slurry process or solution process and converting the zinc oxide so incorporated into high surface area zinc sulfide; and product of the method.

22 Claims, No Drawings

FILTER FOR SORPTION OF HEAVY METALS

DESCRIPTION

1. Technical Field

My invention is directed to a material that may be used as a filter or ion exchanger to sorb heavy metal ions, such as silver, mercury, lead, copper and cadmium, from aqueous solutions.

In industry, for instance, it is desirable to recover silver from spent photo-processing solutions, and also for mitigation of waste stream pollution due to heavy metals in general.

2. Description of Prior Art

In the prior art one technology available for mitigation of waste streams involves precipitation of the heavy metals as the sulfide salt followed by decantation and filtration. It is an expensive operation, however, and requires constant attention by trained technical personnel.

U.S. Pat. No. 3,408,291 (1968) discloses the use of a regenerated cellulose containing percipitated sulfides of nickel, iron and zinc which are exchanged with metal ions such as cadmium, lead, mercury and silver to form insoluble sulfides of these metals. The regenerated cellulose is first treated either with arsenic or antimony which are soluble in regenerated cellulose as part of the step for subsequently forming the precipitated sulfides. Both arsenic and antimony, when subsequently exchanged during the ion exchange process, however, would be highly undesirable stream pollutants.

In my U.S. Pat. No. 3,618,619 there is a disclosure of a crimped cellulose acetate filter tow having dispersed within at least one metal oxide selected from zinc oxide, ferric oxide of cuprous oxide. The zinc oxide disclosed, however, remains as zinc oxide, is of low surface area and serves only to filter hydrogen cyanide from tobacco smoke.

DISCLOSURE OF INVENTION

In accordance with the present invention, I provide a hydrophilic material for sorbing by way of the ion exchange process heavy metals from aqueous solutions, the material being formed from a cellulose ester material selected from cellulose acetate, cellulose butyrate, cellulose propionate or mixed esters thereof. The cellulose ester material has incorporated therein a high surface area zinc sulfide having a surface area of at least about 15 square meters/gram (15 $m^2/g$) and preferably of at least about 24 square meters/gram (24 $m^2/g$). The amount of high surface area zinc sulfide incorporated may be about 5 to about 10% by weight. The hydrophilic material tends to absorb water, and in this manner enables the aqueous solution to make contact with the zinc sulfide particles for subject ion exchange reaction.

I also provide a method for making a material that may be used as a sorbent for heavy metal ions by incorporating in a hydrophilic material a water insoluble zinc sulfide having a high surface area of at least about 15 square meters/gram (15 $m^2/g$) and preferably at least about 24 square meters/gram (24 $m^2/g$), the hydrophilic material being formed from a cellulose ester selected from cellulose acetate, cellulose butyrate, cellulose propionate or mixed esters thereof. The amount of high surface area zinc sulfide incorporated in the hydrophilic material may be about 5 to about 10% by weight.

Since it may not be possible to define all of the resulting characteristics of the material formed by the method, I also claim as my invention the product resulting from the practice of the method.

The water insoluble, high surface area zinc sulfide may be incorporated into the above-described hydrophilic material by treating the material with a slurry of the high surface area zinc sulfide and a nonvolatile solvent for the cellulose ester. The nonvolatile solvent may be selected from triacetin, glycol esters or phthalate esters that are plasticizers for the cellulose esters.

The nonvolatile solvent for the cellulose ester serves to transport the high surface area zinc sulfide just into or at the surface of the hydrophobic material with the result that a skin of the cellulose ester material forms over or encapsulates the particles of the high surface area zinc sulfide. In this manner the zinc sulfide will not flake off during subsequent handling of the material.

The water insoluble, high surface area zinc sulfide may also be introduced into a solution of the selected cellulose ester and a volatile solvent, such as acetone, methylene chloride or chloroform. Then the solution may be spun into fibers or otherwise formed into a suitably shaped material; the volatile solvent evaporates. It is more preferable to form fibers from the solution because fibers present a greater surface area than if the resulting solution were to be used to form a sheet or film, for instance. The fibers may be used in the form of individual fibers or formed into nonwoven or woven shapes.

The water insoluble, high surface area zinc sulfide may also be made from a high surface area zinc oxide having a surface area of at least about 15 square meters/gram (15 $m^2/g$) and preferably of at least about 24 square meters/gram (24 $m^2/g$), and then treating the zinc oxide with a sulfide to convert the high surface area zinc oxide into a water insoluble, high surface area zinc sulfide. The sulfide treatment of the high surface area zinc oxide may take place before incorporation into the hydrophilic material or after such incorporation.

The sulfide for the sulfide treatment may be selected from hydrogen sulfide, ammonium sulfide or sodium sulfide.

By the zinc sulfide being "incorporated", it is meant that the particles of the water insoluble, high surface area zinc sulfide are essentially evenly distributed within and throughout the body of the hydrophilic material, as accomplished by the solution process described herein, or that the zinc sulfide particles have been transported just into or at the surface of the hydrophilic material, as accomplished by the slurry process described herein. In this latter process, a skin of the hydrophilic material forms over and encapsulates the zinc sulfide particles so that the particles will not flake off in aqueous solutions or when otherwise handled.

BEST MODE FOR CARRYING OUT THE INVENTION

A water insoluble zinc sulfide having a high surface area of at least about 15 square meters/gram (15 $m^2/g$) and preferably at least about 24 square meters/gram (24 $m^2/g$) is incorporated in a hydrophilic material, such as a cellulose ester material selected from cellulose acetate, cellulose butyrate, cellulose propionate or mixed esters thereof.

The water insoluble, high surface area zinc sulfide may be incorporated directly by the aforementioned solution or slurry process, or may be made from a zinc oxide having a corresponding high surface area as the zinc sulfide, and then the zinc oxide can be treated with a sulfide to convert the zinc oxide into zinc sulfide. The zinc oxide may be converted to zinc sulfide either before or after incorporation in the hydrophilic material. The sulfide for the conversion treatment may be selected from hydrogen sulfide, ammonia sulfide or sodium sulfide, as previously indicated.

The high surface area zinc sulfide or zinc oxide, as the case may be, may be incorporated into the hydrophilic material by preparing a solution of the selected cellulose ester, such as cellulose acetate, and a volatile solvent, such as acetone, forming the solution into a material such as by spinning the solution into fibers; the volatile solvent evaporates. Other volatile solvents may include methylene chloride and chloroform.

The high surface area zinc sulfide or zinc oxide, as the case may be, may also be incorporated by treating a cellulose ester material such as cellulose acetate fibers with a slurry containing the high surface area zinc sulfide or zinc oxide and a nonvolatile solvent for the cellulose ester, such as triacetin. The solvent serves to transport the zinc sulfide or zinc oxide just into the surface of the fibers so that a skin of cellulose acetate forms over the particles of the zinc sulfide or zinc oxide so incorporated into the fibers so that the particles will not flake off in a solution. The less penetration of the particles into the surface of the cellulose acetate fibers, the faster the reaction rate obtained when the material is used to sorb heavy metals. Other nonvolatile solvents may include glycol esters, and phthalate esters that are plasticizers for the cellulose esters.

More specifically, the hydrophilic material, such as the above-mentioned fibers having the incorporated high surface area zinc oxide may be treated with hydrogen sulfide (gas, a weak acid), or an aqueous solution of a water soluble sulfide salt such as sodium sulfide ($Na_2S$), or ammonium sulfide or potassium sulfide ($K_2S$) to convert the zinc oxide (ZnO) to a water insoluble zinc sulfide (ZnS) or the conversion of zinc oxide to zinc sulfide may take place outside the hydrophilic material first. In the instance of the use of the aqueous solution with sodium or ammonium sulfide, for example, the excess $Na_2S$ or $(NH_4)_2S$ may be washed out and the material dried.

The water soluble sulfide salt for treating the hydrophilic material may be applied as an aqueous solution containing at least 5% of the sulfide salt. Preferably, the solution is essentially saturated.

The amount of high surface area zinc sulfide in the hydrophilic material may be about 5 to about 10%.

What is unexpected is that the high surface area zinc sulfide has a greater reactivity than is normally obtained from conventional size zinc sulfide particles added or incorporated directly into the hydrophilic material.

The resulting filter, as formed from fibers having high surface area zinc sulfide incorporated in a cellulose acetate material, was found, for instance, to reduce the concentration of silver in a photo fixer solution from 5 parts per million to less than 10 parts per billion; to reduce the concentration of copper in a waste stream from 0.4 part per million to less than 0.1 part per million; sorbed a small amount of silver from sea water; and sorbed mercury, lead, copper and cadmium from solutions containing each.

Some samples of zinc oxide that were used in the examples to be described herein included (NJ) New Jersey Zinc Kadox, (EP) Eagle Picher and (SW) Sherwin Williams H.S.A. (high surface area). The surface areas of these samples were about one square meter/gram for NJ, about 6 square meters/gram for EP and about 27 square meters/gram for SW. Surface area was measured by the B.E.T. (Brunauer, Emmett, and Teller) method with a Numinco Ore Surface Area Analyzer.

This invention will be further illustrated by the following examples although it will be understood that these examples are included merely for purposes of illustration and are not intended to limit the scope of the invention.

HYDROPHILIC FIBERS CONTAINING ZINC SULFIDE BY SLURRY PROCESS

Cigarette filter tow made from one of the above-mentioned cellulose esters, cellulose acetate, was selected for use in the examples described below.

Accordingly, cellulose acetate cigarette filter tow was bloomed by blooming apparatus well known in the tobacco industry, and then a slurry consisting of about 30% zinc salt, about 23% polyethylene glycol and about 47% triacetin was sprayed on the bloomed filter tow. The sprayed filter tow was formed into cigarette filter rods and cured at room temperature. All of the different examples shown below in Table I were initially white and had the general appearance of cigarette filter rods. It should also be understood, however, that the filter rod construction chosen for experimentation was a matter of convenience and that the hydrophilic fibers could have been made into other forms or shapes.

In reference then to Table I below, it will be noted that the control filter rod was made from a filter tow having 4.3 denier per filament, with a total denier of 48,000 and that the fiber had a "Y" cross-section. No zinc oxide was applied to the filter rod. The cross-section of the fiber is not thought to be significant, but is given only to identify a particular construction of cigarette filter rod that is readily available in the marketplace. The total denier is also not thought to be significant but is given for the same reason as for the identification of the fiber cross-section. The denier per filament, however, is thought to have some significance in the results.

With the exception of the control example and Example 1 containing conventional reagent-grade powder of zinc sulfide (ZnS), the other filter rods containing zinc oxide were treated with a hydrogen sulfide gas for at least 30 minutes to convert the zinc oxide to zinc sulfide. All of the examples following this treatment were still initially white.

The filter rods each weighed in the range of about 0.5 to about 0.8 gram, and were soaked for about 30 minutes in 100 milliliters of 1% silver nitrate solution.

Example 1 contained about 8% zinc sulfide after completion of the slurry process treatment, and after the silver nitrate solution treatment, the filter rod had developed grey and black areas which shows that it had sorbed a small amount of silver but it was not uniformly black as were the samples in Examples 2 through 6.

Examples 2 through 6, however, contained zinc oxide initially following the slurry process, the zinc being subsequently converted to zinc sulfide during the hydrogen sulfide gas treatment. After these filter rods were soaked in the 100 milliliter 1% silver nitrate solution, they were all found to be uniformly black due to silver sorption. Examples 4, 5 and 6, however, containing the high surface zinc sulfide were found to have sorbed significantly greater amounts of silver than in Examples 1, 2 and 3 as shown in Table I. For instance, with reference to Example 4, a portion of the zinc was converted through the ion exchange process to give about 9.7 to about 10.2% silver, which represents about 46 to 48% conversion. About 3.7% zinc was found to have remained in the sample.

TABLE I

Cellulose Acetate Filters Containing Zinc Sulfide by Slurry Process

| Examples | Filter Tow[1] | Zn[2] | Zn, % | Ag, % | Conversion, % |
|---|---|---|---|---|---|
| Control | 4.3/39Y | None | 0.1 | 0.1 | — |
| 1 | 1.6/48R | 8.0% ZnS[3] | Not uniformly black | | |
| 2 | 3.3/48Y | 8.0% ZnO(NJ) | 4.4–5.7 | 1.1–1.6 | 5–8 |
| 3 | 1.6/48R | 8.0% ZnO(EP) | — | 1.7 | 9 |
| 4 | 1.6/48R | 8.0% ZnO(SW) | 3.7 | 9.7–10.2 | 46–48 |
| 5 | 1.6/48R | 11.0% ZnO(SW) | 3.9–5.4 | 11.0–13.3 | 38–45 |
| 6 | 3.3/48Y | 6.4% ZnO(SW) | 3.9–5.5 | 5.1–7.1 | 33 |

[1]Denier per filament; total denier in thousands; cross-section (Y = Y cross-section (R = crinulated cross-section
[2]NJ = New Jersey Zinc; EP = Eagle Picher; SW = Sherwin Williams H.S.A. (high surface area)
[3]Reagent grade zinc sulfide powder

HYDROPHILIC FIBERS CONTAINING ZINC SULFIDE BY SOLUTION PROCESS

Zinc oxide was added in such quantity to a fiber spinning solution containing about 26% cellulose acetate and about 74% acetone so that when the solution was conventionally spun into fibers the resulting fibers contained about 8% zinc oxide. The fibers were formed into a tow and the tow was subsequently formed into cigarette filter rods. Next the filter rods were treated with hydrogen sulfide gas for about 30 minutes to convert the zinc oxide to zinc sulfide, washed with water and dried. The resulting filter rods were white.

These filter rods were also soaked for about 30 minutes in 100 milliliters of 1% silver nitrate solution. Examples 1 and 2, Table II, sorbed silver to the extent that both were uniformly black, while the control filter rod remained essentially white because it sorbed no silver. It will be noted that Example 2 had a greater percentage of conversion than Example 1 because of the use of high surface area zinc oxide in the fibers of Example 2.

TABLE II

Cellulose Acetate Filters Containing Zinc Sulfide by Solution Process

| Examples | Filter Tow[1] | Zn[2] | Zn, % | Ag, % | Conversion, % |
|---|---|---|---|---|---|
| Control | 4.3/39Y | None | 0.1 | 0.1 | — |
| 1 | 3.3/46Y | 8.5% (NJ) | 5.2 | 1.5 | 7 |
| 2 | 3.3Y[3] | 12.0% (SW) | 7.0 | 7.3 | 23 |

[1]Denier per filament; total denier in thousands; cross-section (Y = Y cross-section)
[2]NJ = New Jersey Zinc; EP = Eagle Picher; SW = Sherwin Williams H.S.A. (high surface area)
[3]Cellulose acetate uncrimped fibers

DISCUSSION OF TABLES I AND II

The data in Tables I and II demonstrate that cellulose acetate fibers containing zinc oxide can be converted to a zinc sulfide that sorbs silver from an aqueous solution of silver nitrate. The amounts of zinc and silver found in the treated fibers are consistent with the assumption that the sorption is a result of the cationic exchange reaction:

$$ZnS + 2AgNO_3 \rightarrow Ag_2S + Zn(NO_3)_2.$$

About 3.3 parts by weight of silver should be sorbed for each part zinc that is displaced. The experimental data are in agreement with this estimate.

Although the filters containing typical pigment grades zinc ozide, Examples 2 and 3 (Table I) for instance, reacted very rapidly with silver, their efficiencies were low, only about 5 to about 8% of the zinc exchanged with the silver. When a high surface area zinc oxide (27 m²/g), however, was substituted for the pigment grade material, efficiencies as high as 48% were achieved (Example 4 of Table I). By increasing the concentration of zinc oxide in the fiber, this enabled higher amounts of silver to be sorbed without affecting efficiency.

The addition of zinc oxide (ZnO) by the slurry process produced filters that were more efficient than filters made by the solution process. For instance, compare Example 5 (Table I) with Example 2 (Table II). The slurry process deposits the zinc oxide close to the filter surface, while the solution process results in uniform deposition throughout the fiber.

EFFECT OF PH ON SORPTIVE PROPERTIES OF FILTERS CONTAINING ZINC SULFIDE

A stock solution containing about 10 milligrams per milliliter of silver as silver chloride in a photographic fixer solution was prepared. Aliquots of the solution were diluted with water to produce the different 25 milliliter solutions shown in Table III. The pH of each 25 milliliters of solution was adjusted with sodium hydroxide (NaOH). After adding a filter rod selected from Example 6 in Table I, each solution was shaken on a mechanical shaker for about two hours. The filter rods were washed with water. The filters were then dried and the treating solutions were analyzed for silver.

TABLE III

Effect of pH on Sorption Properties of Filters

| Wt. of Filter, Mg | pH | Conc. of Ag Before Extraction ppm | mg | Conc. of Ag After Extraction ppm | mg | Conc. of Ag on Filter % | mg | Ag Not Accounted For, mg |
|---|---|---|---|---|---|---|---|---|
| 152 | 4.7 | 1000 | 25.0 | 754 | 18.60 | 3.5 | 5.3 | −1.10 |
| 152 | 4.9 | 250 | 6.25 | 163 | 4.08 | 1.4 | 2.1 | −0.07 |
| 152 | 4.9 | 100 | 2.5 | 34 | 0.85 | 1.1 | 1.7 | +0.05 |

TABLE III-continued

Effect of pH on Sorption Properties of Filters

| Wt. of Filter, Mg | pH | Conc. of Ag Before Extraction | | Conc. of Ag After Extraction | | Conc. of Ag on Filter | | Ag Not Accounted For, mg |
| --- | --- | --- | --- | --- | --- | --- | --- | --- |
| | | ppm | mg | ppm | mg | % | mg | |
| 152 | 4.9 | 50 | 1.25 | 8 | 0.20 | 0.7 | 1.1 | +0.05 |
| 157 | 5.0 | 5 | 0.125 | 0.1 | 0.02 | 0.09 | 0.141 | +0.02 |
| 157 | 7.1 | 250 | 6.25 | 139 | 3.48 | 1.8 | 2.7 | −0.07 |
| 157 | 7.3 | 100 | 2.5 | 30 | 0.75 | 1.2 | 1.8 | +0.05 |
| 157 | 7.5 | 50 | 1.25 | 6 | 0.15 | 0.8 | 1.2 | +0.10 |
| 157 | 8.9 | 250 | 6.25 | 163 | 4.08 | 1.4 | 2.1 | −0.07 |
| 157 | 9.1 | 100 | 2.5 | 56 | 1.40 | 0.7 | 1.1 | 0 |
| 157 | 9.2 | 50 | 1.25 | 19 | 0.48 | 0.5 | 0.8 | +0.03 |

DISCUSSION OF TABLE III

In Table III, sorption of silver from a photographic fixer solution occurred throughout the pH range of 4.5 to 9. The solutions having the higher concentrations of silver adjusted to pH 7 and 9 were somewhat unstable, thus causing the sorption to be variable. At the low concentrations, however, sorption was essentially independent of pH.

The effect of silver concentration in acid fixer solution is shown by the data in Table III. As would be expected, the amount of silver sorbed is a function of the concentration of silver in the fixer solutions.

Table III thus shows that the product obtained has utility over a wide range of pH values.

EFFECT OF EXTRACTION TIME ON SORPTION PROPERTIES OF FILTERS

Filter rods (20 millimeters) selected from Example 6 in Table I were shaken in 25 milliliters of photographic fixer solution containing silver chloride (AgCl) for about one, two and four hours. The silver content of extract and filter rods was determined. As will be noted from Table 4, as the extraction time increased there was also an increase in the amount of silver sorbed on the filter rods.

TABLE IV

Effect of Extraction Time on Sorption Properties of Filters

| Wt. of Filter, mg | Ext. Time Hrs. | Conc. of Ag Before Extraction | | Conc. of Ag After Extraction | | Conc. of Ag on Filter | | Ag Not Accounted For, mg |
| --- | --- | --- | --- | --- | --- | --- | --- | --- |
| | | ppm | mg | ppm | mg | % | mg | |
| 154 | 1 | 50 | 1.25 | 14 | 0.35 | 0.59 | 0.91 | +0.01 |
| 152 | 2 | 50 | 1.25 | 8 | 0.2 | 0.7 | 1.1 | +0.05 |
| 155 | 2 | 50 | 1.25 | 7 | 0.18 | 0.71 | 1.1 | +0.03 |
| 157 | 4 | 50 | 1.25 | 2 | 0.05 | 0.8 | 1.26 | +0.06 |

DISCUSSION OF TABLE IV

As shown in Table IV, therefore, sorption efficiency is a function of extraction time. Approximately 72% of the silver was sorbed from a solution after one hour; 85% after two hours; and 96% after four hours.

SORPTION OF CADMIUM, LEAD, COPPER AND MERCURY

Filter rods of cellulose acetate containing about 7% zinc, as present in the converted zinc sulfide, were put into 8 millimeter ID (inside diameter) tubes. Salt solutions of mercuric chloride, lead acetate, cupric chloride and cadmium acetate were passed through the filters at about 5 milliliters per minute. The filters were then washed and analyzed for metals. The results are shown in Table 5. Cadmium was not determined quantitatively, but the yellow color of cadmium sulfide was observed. The filters containing lead, copper and mercury were found to be black in color due to the ion exchange.

TABLE V

Sorption of Cadmium, Lead, Copper and Mercury

| | Solution | | | Sorbed on Fiber | |
| --- | --- | --- | --- | --- | --- |
| Salt | Volume ml | Conc. ppm | Amount of Metal mg | % | mg |
| Mercuric Chloride | 200 | 10,000 | 2000.0 | 6.4 | 58.2 |
| Lead Acetate | 700 | 51 | 35.7 | 0.48 | 4.4 |
| Cupric Chloride | 700 | 52 | 36.4 | 2.0 | 18.8 |
| Cadmium Acetate | 500 | 50 | 25.0 | | |

DISCUSSION OF TABLE V

Although the data in Table V are limited, it appears that mercury and copper are sorbed more efficiently than lead. These results are consistent with the lower solubilities of the sulfide salts of these metals (solubility constant is 52 for HgS, 35 for CuS, 28 for PbS, 26 for CdS, and 22 for ZnS).

A FURTHER EXAMPLE

A 100 millimeter cellulose acetate filter rod having high surface area zinc sulfide incorporated therein was anchored in the Gulf of Mexico in about three feet of water off the beach of Fort Pickens, Florida. After 24 hours the sample was collected and analyzed for heavy metals. It contained 81 parts per million silver and 2.2% zinc. Lead and copper were not detected.

Although the examples mentioned above refer to cellulose acetate, the other cellulose esters mentioned herein, such as cellulose butyrate, cellulose propionate or mixed esters thereof, would be expected to perform in essentially the same manner. In the following examples, therefore, the results would appear to demonstrate this.

EXAMPLE 1

Fibers of cellulose acetate propionate (about 14% propionyl) are sprayed with a slurry comprising about 26.5% high surface area zinc oxide (Sherwin Williams H.S.A.), about 29.5% triacetin and about 44% poly(ethylene glycol). The fibers are exposed to an atmosphere of hydrogen sulfide for about 30 minutes, then washed with water and dried. The fibers are immersed in a 1% silver nitrate solution, then washed with water and dried. The dried fibers contain about 7% silver.

EXAMPLE 2

Fibers of cellulose acetate butyrate (about 17% butyryl) are treated as in Example 1. The fibers sorb about 7% silver form the silver nitrate solution.

EXAMPLE 3

A high surface area zinc oxide (Sherwin Williams H.S.A.) is put into a glass which has a porous fitted disc bottom. Hydrogen sulfide gas is passed upwardly through the column for about 30 minutes to obtain a highly reactive zinc sulfide. A slurry consisting of about 30% of the treated material, about 30% triacetin and about 40% propylene glycol, is prepared.

A textile tow of crimped cellulose acetate fiber is passed through a blooming device that separates the fiber into a uniform band of about 10 inches in width. The band is pulled through an enclosed booth where the prepared slurry is sprayed onto the moving tow band. The tow is processed into paper-wrapped cylinders of about 8 mm. in diameter and about 120 mm. long with a conventional cigarette filter maker. After curing at about 70° C., the fibers are banded together at their points of contact to form coherent white cylinders. These fibers are treated with a 1% solution of silver nitrate, and about 7% silver is sorbed.

EXAMPLE 4

Fibers of cellulose tripropionate are treated as in Example 1. The resulting fibers sorb about 7% silver.

EXAMPLE 5

Fibers of cellulose tributyrate are treated as in Example 1. The fibers sorb about 7% silver.

The invention has been described in detail with particular reference to preferred embodiment thereof, but it will be understood that variations and modifications can be effected within the spirit and scope of the invention.

I claim:

1. The method of making a sorbent for heavy metals comprising:
    incorporating in a hydrophilic material a zinc sulfide having a high surface area of at least about 15 $m^2/g$, said hydrophilic material being formed from a cellulose ester selected from cellulose acetate, cellulose butyrate, cellulose propionate or mixed esters thereof.

2. The method as defined in claim 1 wherein said zinc sulfide incorporated in said hydrophilic material has a high surface area of at least about 24 $m^2/g$.

3. The method as defined in claim 1, wherein said high surface area zinc sulfide is incorporated in the amount of about 5% to about 10% by weight in said hydrophilic material by treating in such manner said hydrophilic material with a slurry comprising said zinc sulfide and a nonvolatile solvent for said hydrophilic material so that said zinc sulfide becomes encapsulated just within the surface of said hydrophilic material.

4. The method as defined in claim 3, wherein said high surface area zinc sulfide is formed from zinc oxide having a high surface area of at least about 15 $m^2/g$ by treating said zinc oxide with a sulfide to convert the zinc oxide into said zinc sulfide.

5. The method as defined in claim 3, wherein said high surface area zinc sulfide is formed from zinc oxide having a high surface area of at least about 24 $m^2/g$ by treating said zinc oxide with a sulfide to convert the zinc oxide into said zinc sulfide.

6. The method as defined in claim 4, wherein the sulfide in said sulfide treatment is selected from hydrogen sulfide, ammonium sulfide or sodium sulfide.

7. The method as defined in claim 5, wherein the sulfide in said sulfide treatment is selected from hydrogen sulfide, ammonium sulfide or sodium sulfide.

8. The method as defined in claim 3, wherein said nonvolatile solvent for said hydrophilic material is selected from triacetin, glycol esters, or phthalate esters that are plasticizers for said cellulose esters.

9. The method as defined in claim 1, wherein the high surface area zinc sulfide is incorporated in the amount of about 5% to about 10% by weight in said hydrophilic material by being introduced into a spinning solution comprising said cellulose ester and a volatile solvent for said cellulose ester, and then spinning said hydrophilic material.

10. The method as defined in claim 9, wherein said volatile solvent for said cellulose ester is selected from acetone, methylene chloride or chloroform.

11. The method as defined in claim 1, wherein said high surface area zinc sulfide is incorporated in said hydrophilic material by incorporating a zinc oxide having a high surface area of at least about 15 $m^2/g$ and then treating said zinc oxide with a sulfide.

12. The method as defined in claim 11, wherein the sulfide in said sulfide treatment is selected from hydrogen sulfide, ammonium sulfide or sodium sulfide.

13. The method as defined in claim 11, wherein said zinc oxide is incorporated in said hydrophilic material by treating said hydrophilic material with a slurry comprising said zinc oxide and a nonvolatile solvent for said hydrophilic material.

14. The method as defined in claim 13, wherein said nonvolatile solvent for said hydrophilic material is selected from triacetin, glycol esters, or phthalate esters that are plasticizers for said cellulose esters.

15. The method as defined in claim 11, wherein said zinc oxide is incorporated in a spinning solution comprising said cellulose ester and a volatile solvent for said cellulose ester, and then spinning said hydrophilic material.

16. The method as defined in claim 15, wherein said volatile solvent for said cellulose ester is selected from acetone, methylene chloride or chloroform.

17. A hydrophilic material for sorbing heavy metals and made in accordance with the method defined in claim 3.

18. A hydrophilic material for sorbing heavy metals and made in accordance with the method defined in claim 9.

19. A hydrophilic material for sorbing heavy metals and made in accordance with the method defined in claim 13.

20. A hydrophilic material for sorbing heavy metals and made in accordance with the method defined in claim 15.

21. A hydrophilic material for sorbing heavy metals comprising a material formed from a cellulose ester selected from cellulose acetate, cellulose butyrate, cellulose propionate or mixed esters thereof, and having incorporated therein about 5% to about 10% by weight a zinc sulfide having a high surface area of at least about 15 $m^2/g$.

22. A hydrophilic material as defined in claim 21, wherein said zinc sulfide incorporated in said material has a high surface area of at least about 24 $m^2/g$.